US009303432B2

(12) United States Patent
Sambar

(10) Patent No.: US 9,303,432 B2
(45) Date of Patent: Apr. 5, 2016

(54) HANDLE WITH OPERABLE BARRIERS AND RELATED LOCKING METHODS

(75) Inventor: Homer S. Sambar, Shorewood, WI (US)

(73) Assignee: ROCKWELL AUTOMATION TECHNOLOGIES, INC., Mayfiels Heights, OH (US)

( * ) Notice: Subject to any disclaimer, the term of this patent is extended or adjusted under 35 U.S.C. 154(b) by 670 days.

(21) Appl. No.: 13/297,140

(22) Filed: Nov. 15, 2011

(65) Prior Publication Data

US 2013/0118294 A1 May 16, 2013

(51) Int. Cl.

| | |
|---|---|
| ***H01H 9/28*** | (2006.01) |
| ***B23P 11/00*** | (2006.01) |
| ***B23P 17/00*** | (2006.01) |
| ***E05B 17/22*** | (2006.01) |
| ***H01H 9/22*** | (2006.01) |
| ***H01H 19/02*** | (2006.01) |
| ***E05B 1/00*** | (2006.01) |
| *E05B 63/00* | (2006.01) |

(52) U.S. Cl.

CPC ................. *E05B 17/22* (2013.01); *E05B 1/003* (2013.01); *H01H 9/223* (2013.01); *H01H 19/02* (2013.01); *E05B 2063/0026* (2013.01); *Y10T 74/20516* (2015.01)

(58) Field of Classification Search

USPC .......... 200/50.19, 50.11, 50.18, 43.11, 43.14, 200/43.15, 43.16, 400, 329, 332–336; 292/336.3, 336.5, 358, 359; 70/432; 361/616; 40/460; 29/525.01, 434, 436, 29/446

See application file for complete search history.

(56) References Cited

U.S. PATENT DOCUMENTS

| | | | | | |
|---|---|---|---|---|---|
| 1,337,401 | A * | 4/1920 | Heberling | | 40/460 |
| 2,013,055 | A * | 9/1935 | Kerwin, Jr. | | 70/221 |
| 2,260,073 | A * | 10/1941 | Ellis | | 200/50.19 |
| 2,263,760 | A * | 11/1941 | Currie | | 200/50.19 |
| 2,361,535 | A * | 10/1944 | Evans | | 200/50.19 |
| 2,467,307 | A | 4/1949 | Herman | | |
| 2,550,125 | A * | 4/1951 | Schueler et al. | | 200/50.19 |
| 2,565,669 | A * | 8/1951 | Smith | | 116/290 |
| 2,851,548 | A | 9/1958 | William | | |
| 3,808,635 | A | 5/1974 | Moran | | |
| 3,902,152 | A | 8/1975 | Van Benthuysen | | |
| 3,929,360 | A * | 12/1975 | Gulistan | | 292/67 |
| 4,038,508 | A * | 7/1977 | Mapelsden | | 200/329 |
| 4,114,001 | A * | 9/1978 | Corfield | | 200/50.06 |
| 4,311,887 | A | 1/1982 | Takagi et al. | | |
| 4,490,999 | A * | 1/1985 | Castle et al. | | 70/432 |
| 4,583,775 | A * | 4/1986 | Bisbing | | 292/64 |
| 4,602,136 | A | 7/1986 | Deneke et al. | | |
| 4,612,424 | A * | 9/1986 | Clark et al. | | 200/50.18 |
| 4,739,300 | A | 4/1988 | Kuratani | | |
| 4,851,621 | A | 7/1989 | Borchardt et al. | | |
| 4,951,980 | A * | 8/1990 | Wetzel | | 292/202 |
| 5,111,009 | A * | 5/1992 | Chan et al. | | 200/330 |
| 5,159,658 | A | 10/1992 | Tuttle | | |
| 5,180,050 | A * | 1/1993 | Rada et al. | | 200/329 |
| 5,219,070 | A * | 6/1993 | Grunert et al. | | 200/330 |

(Continued)

FOREIGN PATENT DOCUMENTS

| | | |
|---|---|---|
| CN | 1881495 A | 12/2006 |
| EP | 0564173 A1 | 10/1993 |

*Primary Examiner* — Essama Omgba

(74) *Attorney, Agent, or Firm* — Viksnins Harris & Padys PLLP

(57) ABSTRACT

A handle assembly and related methods for actuating a mechanism such as a disconnect switch.

10 Claims, 11 Drawing Sheets

(56) References Cited

U.S. PATENT DOCUMENTS

| | | | | |
|---|---|---|---|---|
| 5,263,348 | A * | 11/1993 | Wittwer | 70/379 R |
| 5,302,925 | A * | 4/1994 | Castonguay et al. | 335/17 |
| 5,388,307 | A | 2/1995 | Hyde | |
| 5,493,084 | A | 2/1996 | Whitaker | |
| 5,634,357 | A * | 6/1997 | Nutter et al. | 70/210 |
| 5,821,487 | A * | 10/1998 | Groves et al. | 200/50.02 |
| 5,889,461 | A | 3/1999 | Ebata | |
| 5,902,973 | A | 5/1999 | Ramey et al. | |
| 6,068,308 | A * | 5/2000 | Molzer | 292/336.3 |
| 6,179,352 | B1 * | 1/2001 | Schneeberger | 292/347 |
| 6,284,989 | B1 | 9/2001 | Bernier et al. | |
| 6,318,770 | B1 * | 11/2001 | Molzer | 292/336.3 |
| 6,386,602 | B1 * | 5/2002 | Lan | 292/336.3 |
| 6,423,912 | B1 * | 7/2002 | Arenz et al. | 200/43.08 |
| 6,494,509 | B2 * | 12/2002 | Molzer | 292/336.3 |
| 6,502,872 | B1 * | 1/2003 | Molzer | 292/336.3 |
| 6,596,952 | B1 * | 7/2003 | Degrazia et al. | 200/330 |
| 6,702,342 | B2 * | 3/2004 | Molzer | 292/336.3 |
| 6,715,807 | B2 * | 4/2004 | Molzer | 292/336.3 |
| 6,868,705 | B2 * | 3/2005 | Miao | 70/492 |
| 6,938,445 | B2 * | 9/2005 | Huang | 70/107 |
| 6,969,813 | B1 * | 11/2005 | Winslett et al. | 200/330 |
| 7,214,895 | B2 * | 5/2007 | Houck et al. | 200/310 |
| 7,368,675 | B2 * | 5/2008 | Ishido et al. | 200/331 |
| 7,420,133 | B2 | 9/2008 | Farrow et al. | |
| 8,100,443 | B2 * | 1/2012 | Talpe | 292/347 |
| 8,115,127 | B2 * | 2/2012 | Nguyen et al. | 200/330 |
| 8,177,268 | B2 * | 5/2012 | Varney et al. | 292/297 |
| 8,347,677 | B2 * | 1/2013 | Flandrinck | 70/379 R |
| 8,664,552 | B2 * | 3/2014 | Knoerrchen et al. | 200/43.11 |
| 2005/0184538 | A1 * | 8/2005 | Huang et al. | 292/336.3 |
| 2009/0256368 | A1 * | 10/2009 | Le et al. | 292/358 |
| 2010/0199727 | A1 * | 8/2010 | Varney et al. | 70/209 |
| 2010/0263419 | A1 * | 10/2010 | Calleberg | 70/277 |
| 2011/0181378 | A1 | 7/2011 | Yamada et al. | |
| 2012/0018286 | A1 * | 1/2012 | Knoerrchen et al. | 200/43.11 |
| 2013/0009410 | A1 * | 1/2013 | Ludwig et al. | 292/336.3 |
| 2013/0118293 | A1 | 5/2013 | Sambar | |
| 2013/0285392 | A1 * | 10/2013 | Gupta et al. | 292/336.3 |
| 2014/0068919 | A1 * | 3/2014 | Weber et al. | 29/525.01 |
| 2015/0221458 | A1 * | 8/2015 | Oneufer et al. | |

* cited by examiner

FRONT VIEW OFF

SHAFT VIEW

SHAFT RETAINED IN ON POSITION

SHAFT RETAINED IN OFF POSITION

SECTION OFF LOCKED

DEFEATER RESET

DEFEATER ACTIVATED (PUSHED)

HANDLE WITH OPERABLE BARRIERS AND RELATED LOCKING METHODS

BACKGROUND

Factories with equipment include controls over the equipment in order to prevent unauthorized modifications during use or during equipment shut downs. One example of control includes mounting electrical controls within an electrical enclosure. A mechanism is provided such that when the door handle is operated to open the door and access the control equipment, power to the equipment is disconnected, for example, with a disconnect switch.

DESCRIPTION OF THE EMBODIMENTS

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural changes may be made without departing from the scope of the present invention. Therefore, the following detailed description is not to be taken in a limiting sense, and the scope of the present invention is defined by the appended claims and their equivalents.

Figure 1:
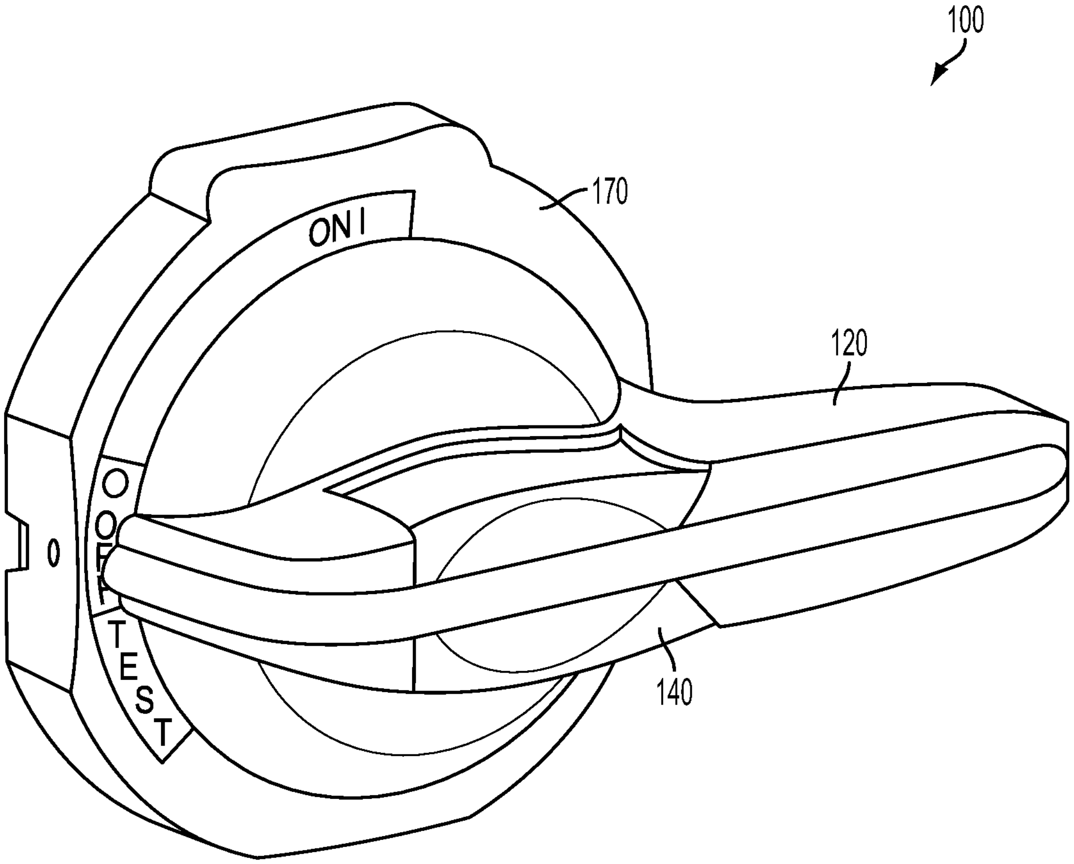
FIG. 1 illustrates a front perspective view of a handle assembly and a base assembly in accordance with one or more embodiments.
Figure 2:
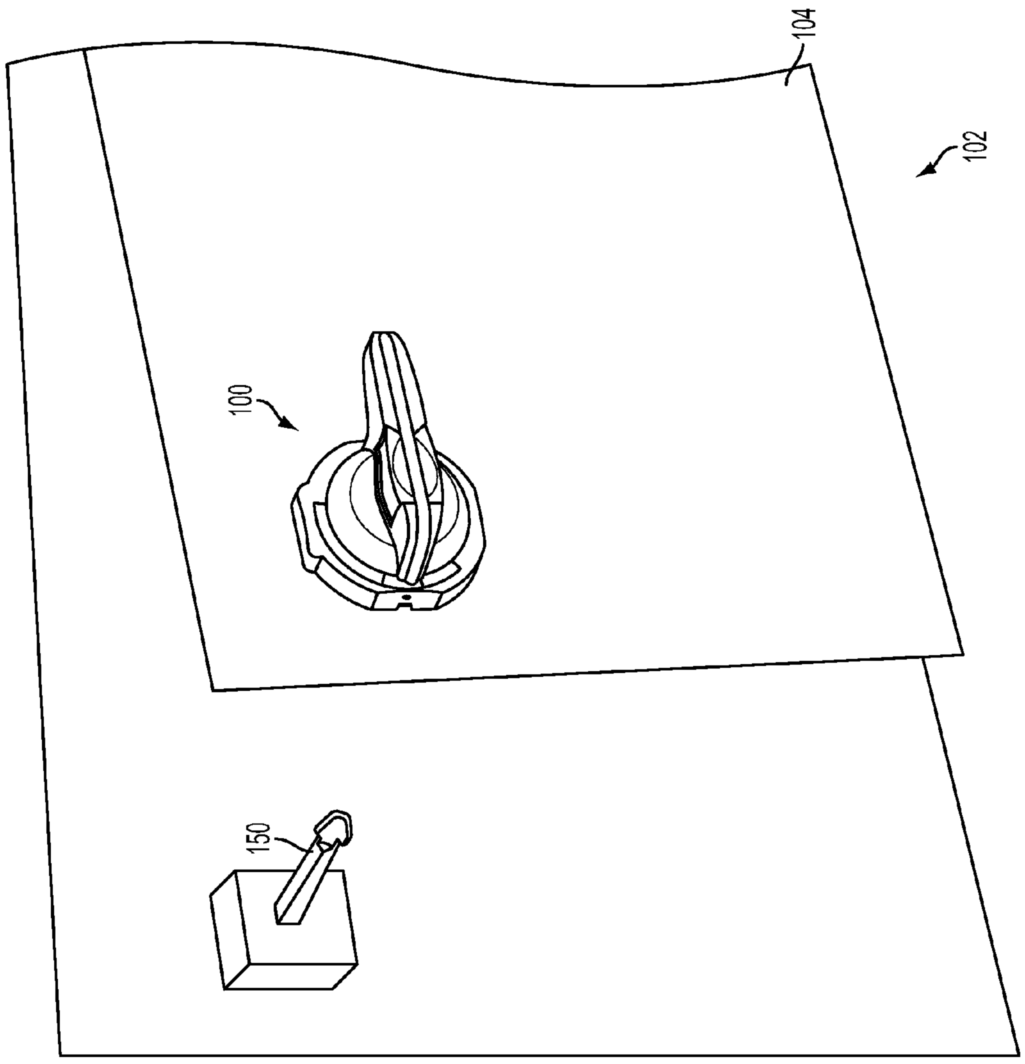
FIG. 2 illustrates a view of a system with enclosure in accordance with one or more embodiments.
Figure 3:
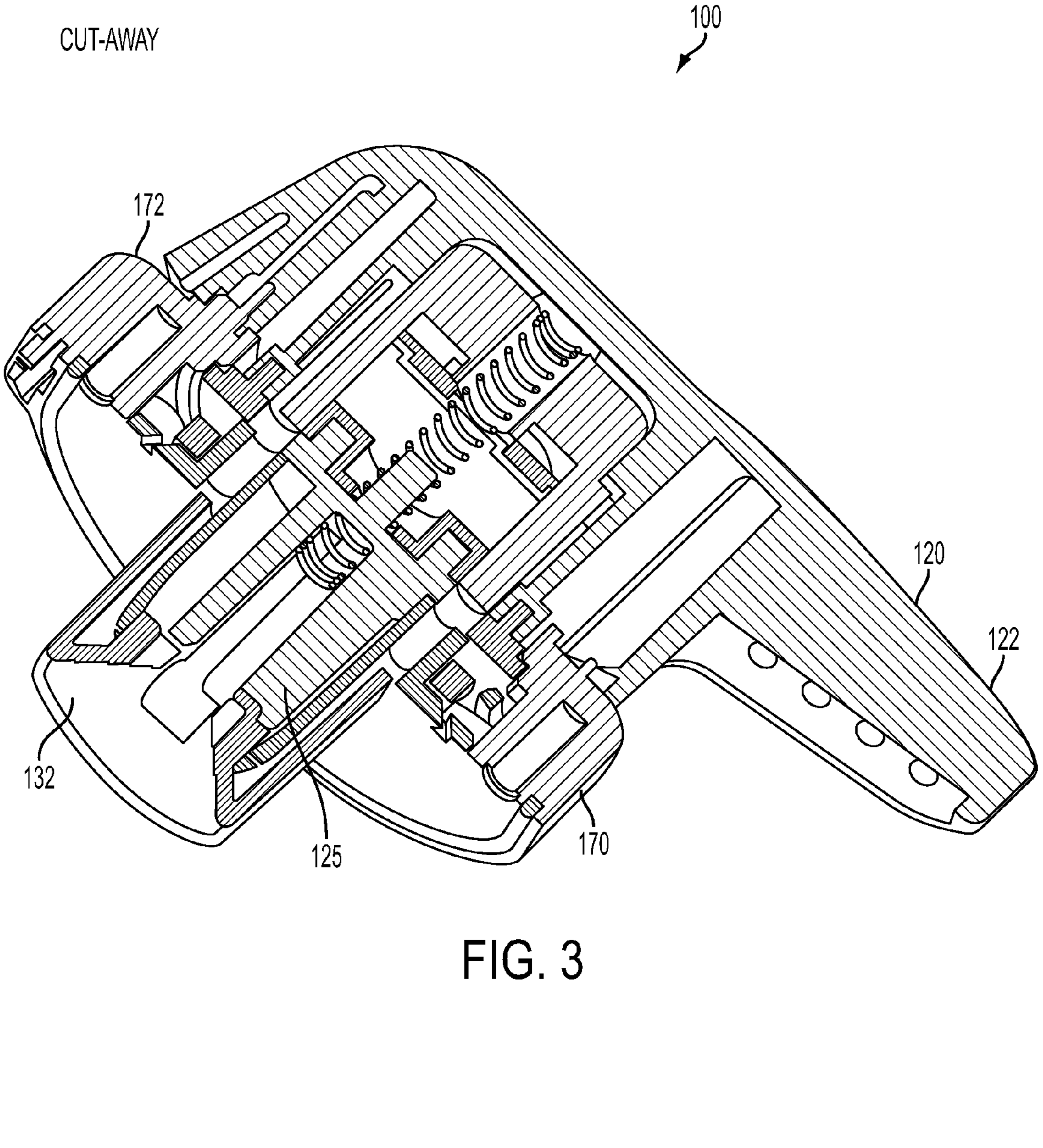
FIG. 3 illustrates a cross-sectional view of a handle assembly and a base assembly in accordance with one or more embodiments.
Figure 4:
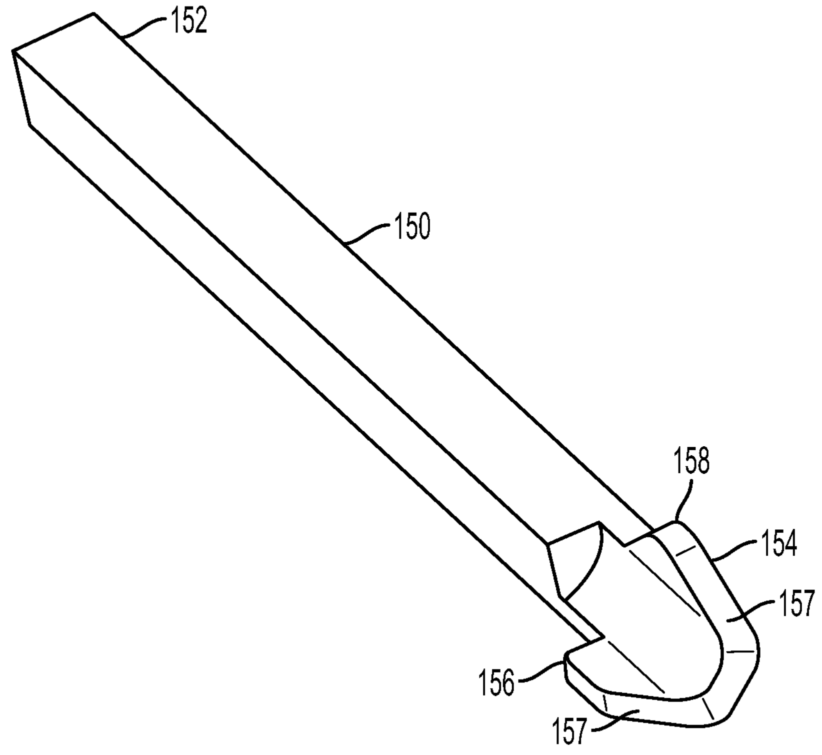
FIG. 4 illustrates a perspective view of a shaft in accordance with one or more embodiments.

FIGS. 1 and 2 illustrate one or more embodiments of an apparatus 100. The apparatus 100 includes a handle assembly 120 and a base assembly 170. The apparatus 100 can be used to control the opening and closing of an electrical box 104 or enclosure of a system 102. In an option, the apparatus 100 can be used to control operation of a disconnect switch. The apparatus 100 further includes a shaft 150 that interacts with the handle assembly 120 and the base assembly 170. The apparatus 100 is used, in an embodiment, to turn on or off, or in other positions such as, but not limited to, test positions for disconnect switches. In an embodiment, the handle assembly 120 can be fixated, for instance, locked, in a particular position, such as in an ON or an OFF position. In a further option, the apparatus 100 is used to prevent opening of the box 104.

In an option, the handle assembly 120 is mounted on an electrical box 104 of the system 102. In an embodiment, the handle assembly 120, base assembly, and the shaft 150 are operably coupled with a disconnect system. The system includes the electrical box 104 and the handle assembly 120, where the handle assembly 120 is operably coupled with the disconnect switch or circuit breaker. The switch is operably and/or electrically coupled with one or more of industrial equipment, power supplies, motors, conveyors.

As shown in FIGS. 1, 3, 5, 6, the handle assembly 120 includes a handle 122 and a rotator 124. The rotator 124 is coupled with the base assembly 170, such as a front portion of the base assembly 170, where the rotator 124 rotates relative to the base assembly 170. The handle 122 is sized to be comfortably used in a single handed operation. The handle 122 includes an elongate portion that extends from a first portion to a second portion. The first portion is coupled with the rotator 124 and allows for the handle 122 to be moved, such as rotated, into various positions, such as ON, OFF, TEST, and to rotate the shaft 150.

The handle 122 is coupled with the rotator 124, and the rotator 124 includes a coupler 125. The coupler 125 provides a mechanical interconnect between the handle 122 and the shaft 150, and translates movement of the handle 122 and the rotator 124 to the shaft 150.

The handle assembly 120 further includes, as shown in FIGS. 1 and 7, a lock assembly 140. The lock assembly 140 allows for the handle assembly 120 to be fixed in a particular position, for example, in an OFF position, such that no power is provided to a machine. The lock assembly 140 includes a movable cover 142 that conceals a lock fixation feature, such as an opening 144. In an embodiment, the cover 142 envelopes the lock fixation feature, for example, external to the fixation feature. The cover 142 is movable relative to the handle 122 and/or the rotator 124. The cover 142 can be moved from a first position where the cover 142 conceals the opening, as shown in FIG. 1, to a second position where the cover 142 reveals the fixation features 144, such as an opening, as shown in FIG. 7. In an option, the cover 142 is resiliently held in the first position by a resilient member 148, such as, but not limited to, a spring. The cover 142 can be depressed with a single handed operation, and depresses the cover 142 to a position within the base.

Figure 7A:
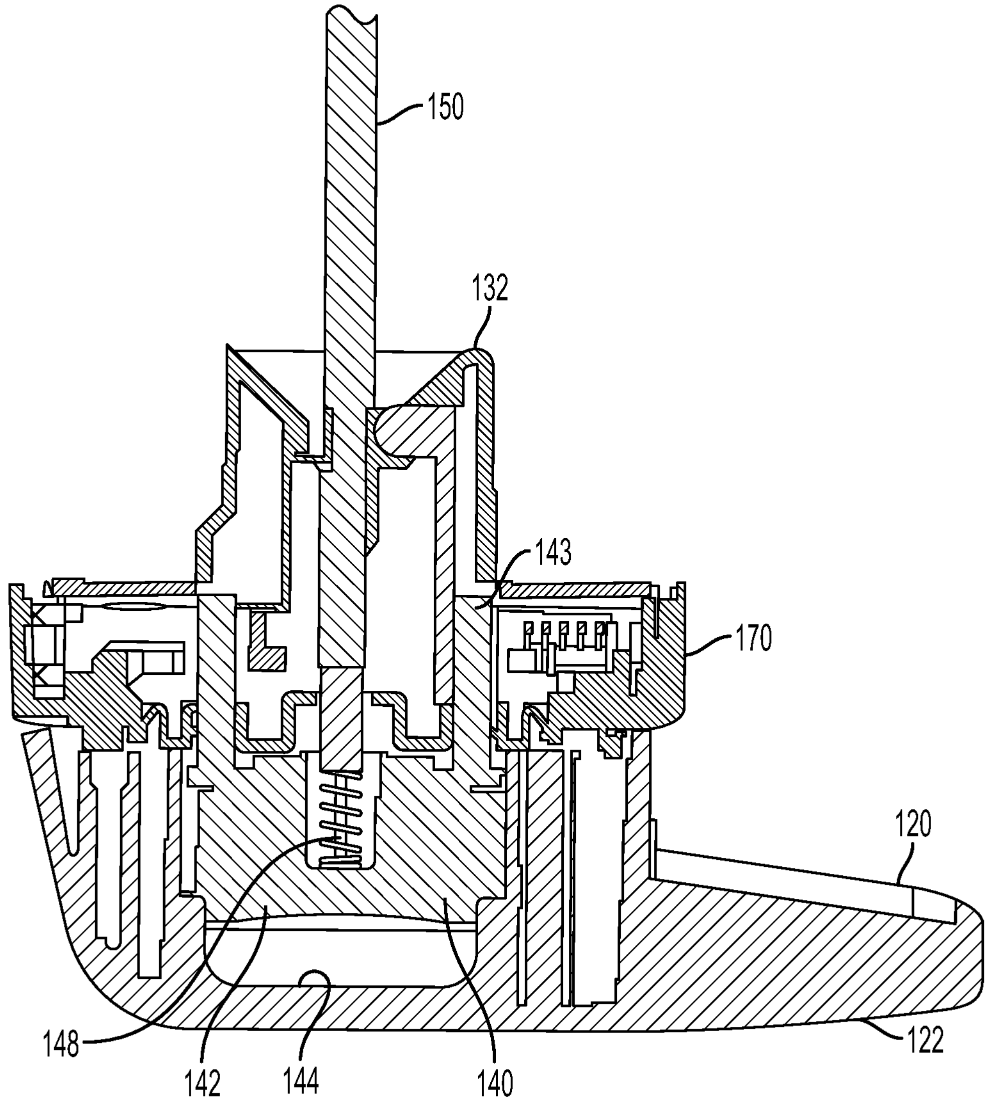
FIG. 7A illustrates a cross-sectional view of a handle assembly and a base assembly in accordance with one or more embodiments.
Figure 7B:
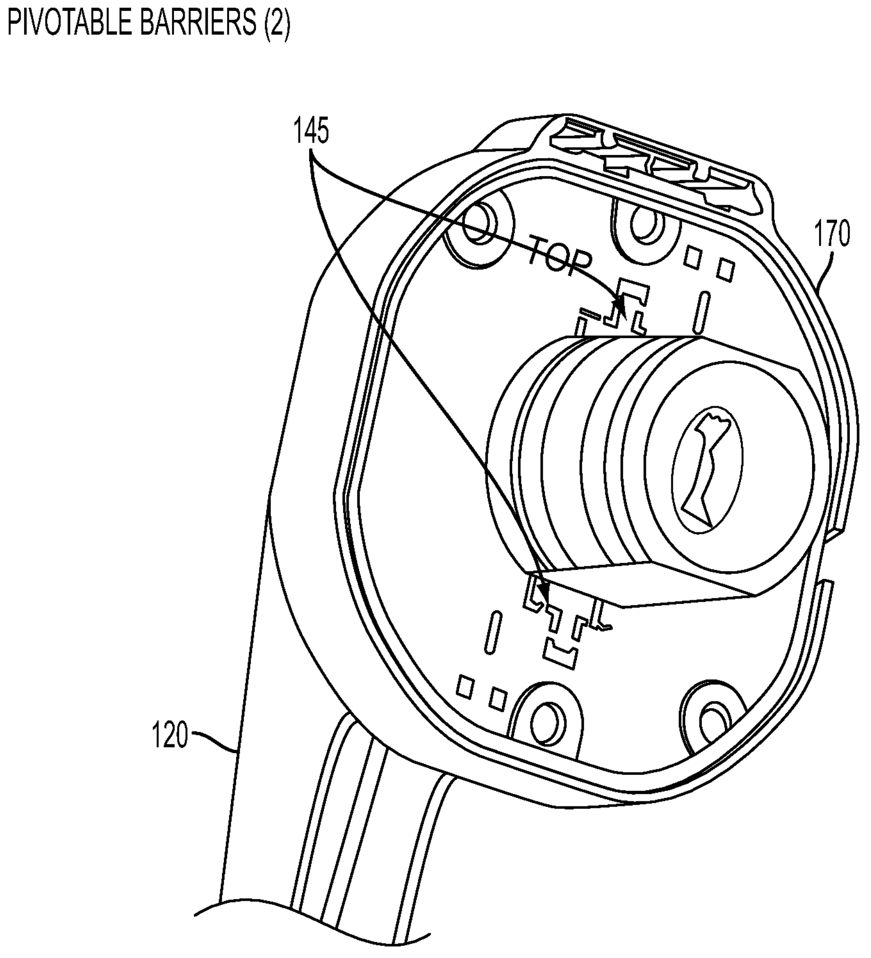
FIG. 7B illustrates a view of a handle assembly and a base assembly in accordance with one or more embodiments.
Figure 8:
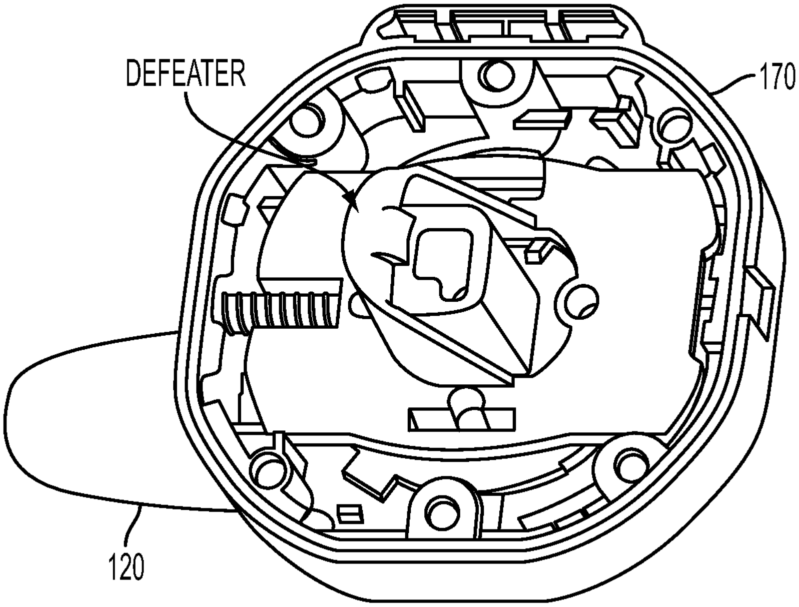
FIG. 8 illustrates a rear perspective view of a handle assembly and a portion of base assembly and a defeater plug in accordance with one or more embodiments.
Figure 9:
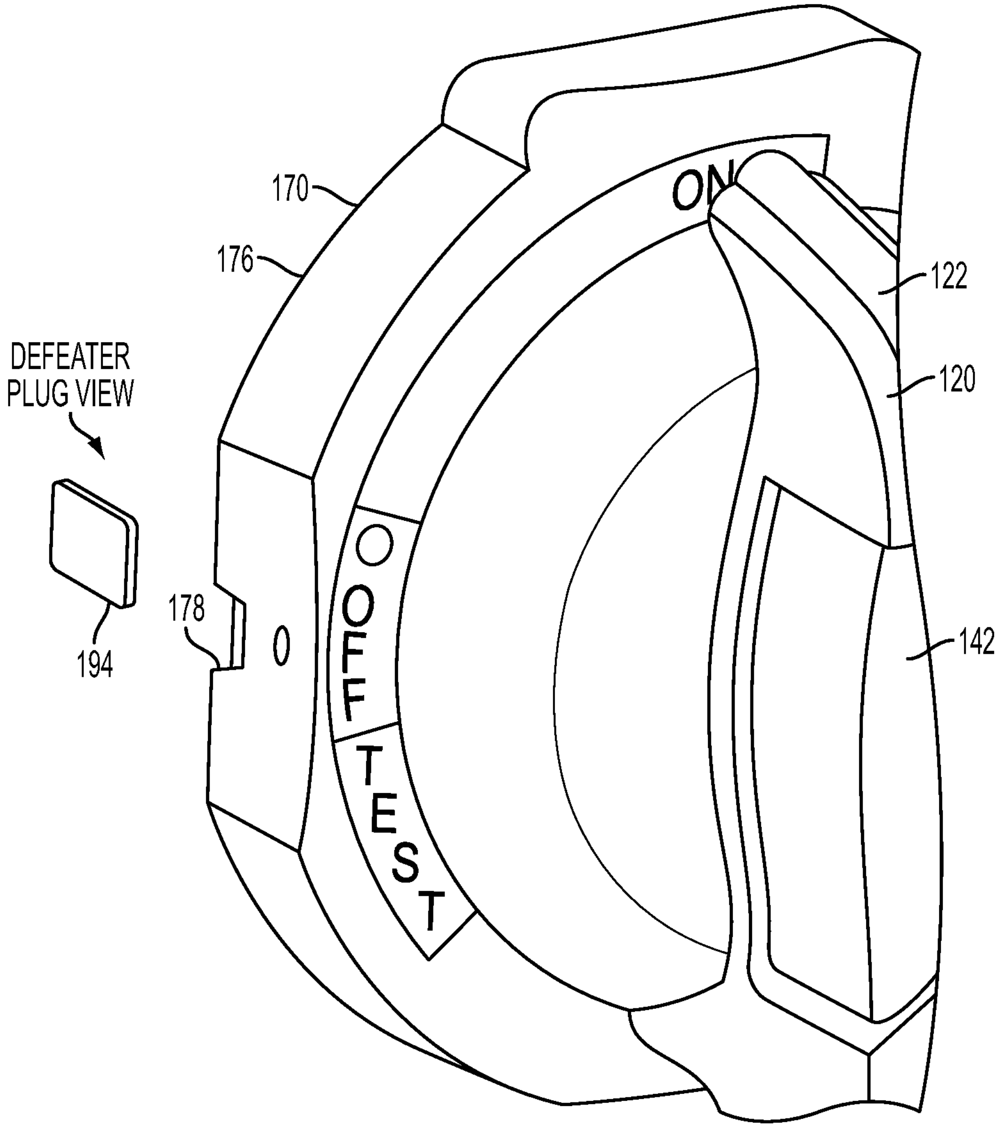
FIG. 9 illustrates perspective view of a handle assembly, a base assembly, and a defeater block in accordance with one or more embodiments.
Figure 10:
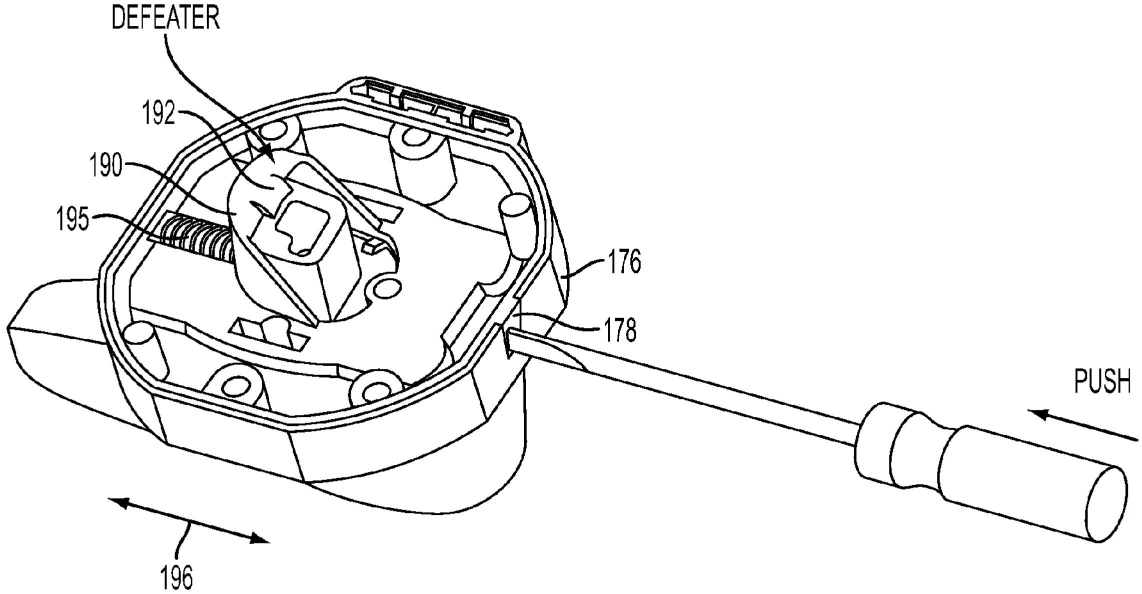
FIG. 10 illustrates a rear perspective view in accordance with one or more embodiments.

When the cover 142 is placed in the first position, the handle 122 can be rotated, in an embodiment, from the OFF position to the ON position, and vice versa. In the second position, the handle 122 cannot be moved. For example, if it is desired for the handle 122 to be locked in a particular position, such as the OFF position, the cover 142 is placed in the second position, and a locking member, such as a padlock, can be placed through the passage which forces the cover to remain the second position. When in the second position, as shown in FIG. 7A, one or more portions 143 of the cover 142 are disposed through the rotator base assembly 170, and prevent movement of the rotator 124 relative to the base assembly 170, preventing rotation of the handle 122. In an option, structure such as operable barrier 145, as shown in FIG. 7B, is provided that can be moved, allowing for the cover 142 to be moved when the handle 122 is in other positions, such as in the ON position, and allows for the handle 122 is to be locked in multiple positions with the cover 142. In an embodiment, the operable barrier is movable, pivotable, or otherwise operable to allow for the portions 143 to lock the handle 122 with the base assembly 170. In an embodiment, the operable barrier is a pivotable tab.

In an example, a method includes turning a handle of an assembly to an OFF position and locked position. The method further includes moving a cover from a first position to a second position, for example by overcoming a resilient force of a resilient member, the cover concealing at a portion of a locking fixation feature when the cover is in the first position. One or more portions of the cover are disposed within at least a portion of the base assembly in the second position and preventing rotation of the handle assembly relative to the base assembly with the one or more portions, revealing at least a portion of the locking fixation features when the cover is in the second position. In an embodiment, locking structure is disposed through at least a portion of the locking fixation features, such as a pad lock, and the handle of the handle assembly is locked in a particular orientation.

In one or more embodiments, the method further includes moving operable barriers of the base assembly, and moving the cover within the base assembly to lock the handle assembly in multiple handle orientations, moving operable barriers includes moving pivotable tabs and providing an opening in the base assembly to receive the cover therein.

The base assembly 170 is defined in part by a front portion and a rear portion. The rear portion of the base assembly 170 is mounted, in an embodiment, to a door of an enclosure (FIG. 2). The front portion of the base assembly 170 provides an interface for the handle of the handle assembly, and at least a portion of the rotator 124 is received through the front portion of the base assembly.

The handle and rotator 124 are coupled through the front portion. On a rear portion of the handle assembly 120 is the rear housing including a socket 132, which is adapted to receive the shaft 150. In an option, the socket 132 has a tapered interior portion. The socket 132 receives the second end portion of the shaft therein, and directs the shaft to the coupling 125 of the rotator 124.

The base assembly including a housing 176, such as a front housing for the front portion 172 and a rear housing for the rear portion. The housing 176 includes an opening 178 therein. The opening 178 allows access to the defeater 190, which is disposed within the base assembly 170.

The defeater 190 includes a defeater catch 192 that interacts with the end portion of the shaft and can prevent longitudinal movement of the shaft relative to the handle assembly 120, depending on the orientation of the shaft 150, and can prevent opening of the enclosure by the handle assembly. The defeater catch 192 hooks with a component of the shaft, such as a catch of the shaft.

The defeater catch 192 is, in an embodiment, resiliently held in position by a spring member 195. The defeater and the defeater catch 192 toggle between one or more positions, such as, but not limited to a position in which the shaft is caught by the defeater catch to a position where the defeater catch does not block a path of the shaft. The defeater catch 192 of the defeater 190 can be overridden, and the shaft can be released from the catch 192. In an option, the defeater 190 is moved, for instance toggled, along an axis other than along a direction against pulling or pushing movement of the enclosure door to which the handle is coupled, or along movement of the enclosure door travel. In an embodiment, the defeater 190 moves along the direction indicated at 196.

The defeater 190 and defeater catch 192 can be overridden. An object such as an elongate member can be disposed though an opening 178 of the housing 176 of the base assembly and used to move against the resilient member to release the catch of the shaft from the defeater catch. In an embodiment, an operable defeater block 194, such as a shield disposed in a pocket of the base assembly. The defeater block 194 physically obscures the opening of the base assembly housing so that the elongate member cannot be disposed through the opening, and the defeater cannot be overridden. Access to the defeater external to the housing of the base assembly can be prevented. In an embodiment, the method includes inserting a defeater block for a defeater from an assembly including the handle assembly, turning a handle of the handle assembly to an OFF position and locked position, and preventing moving of the defeater and overcoming the lock.

A method of using the defeater includes turning a handle of the handle assembly to an OFF position and locked position, and moving the defeater and overcoming the lock. In one or more embodiments, moving the defeater and overcoming the lock includes toggling the defeater, moving the defeater includes pressing the defeater against a resilient member, moving the defeater includes disposing a member through an opening of the base assembly, and/or moving the defeater includes releasing a defeater catch from a catch of a shaft.

The shaft 150, for example, an elongate shaft, extends from a first end portion 152 to a second end portion 154. The first end portion 152 is adapted to couple and/or operably engage with a disconnect switch, for example within a power box, as shown in FIG. 2. The second end portion 154 is adapted to be engaged with movement of the handle 122 of the handle assembly 120, for example, the second end portion 154 is disposable within a socket of the handle assembly 120.

Figure 5:
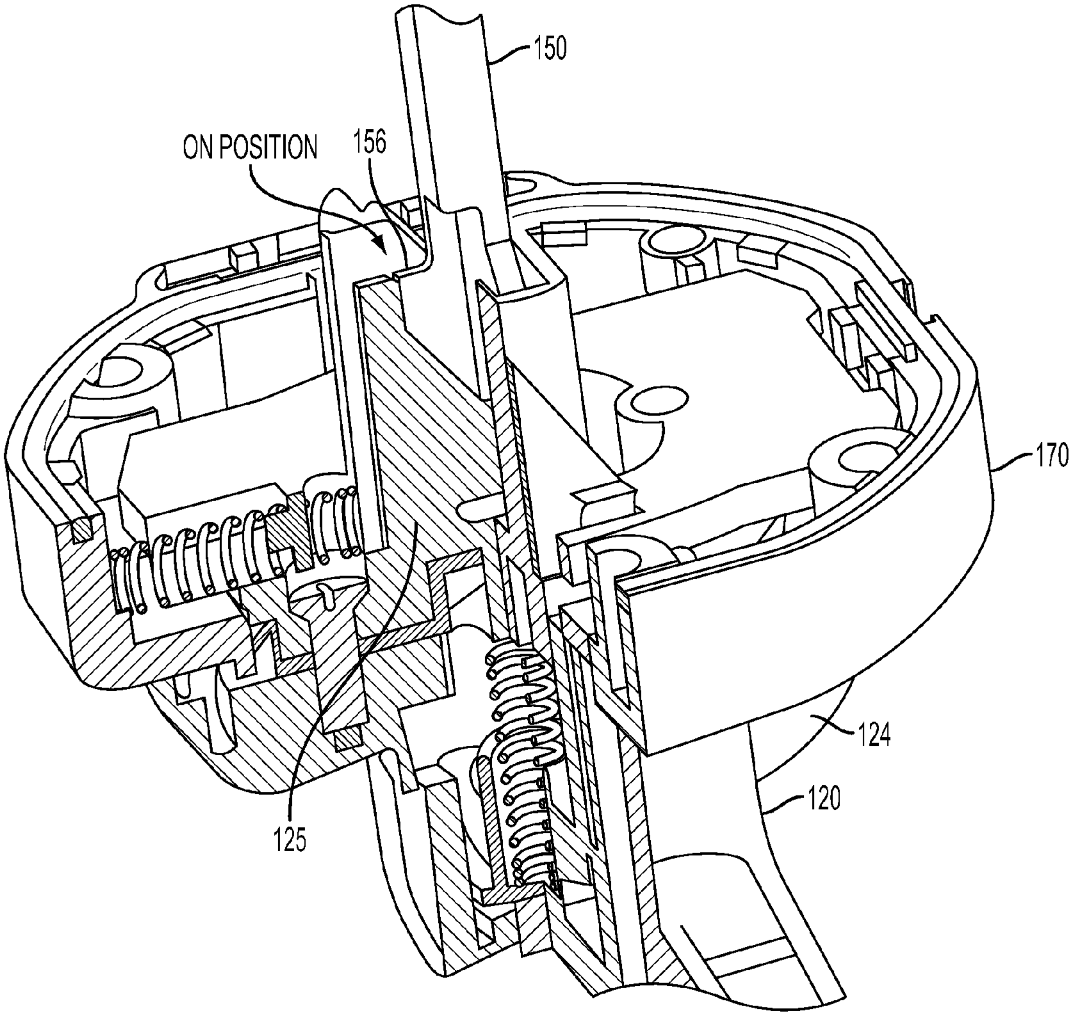
FIG. 5 illustrates a cut-away view of a perspective view of a handle assembly and a base assembly in accordance with one or more embodiments.
Figure 6:
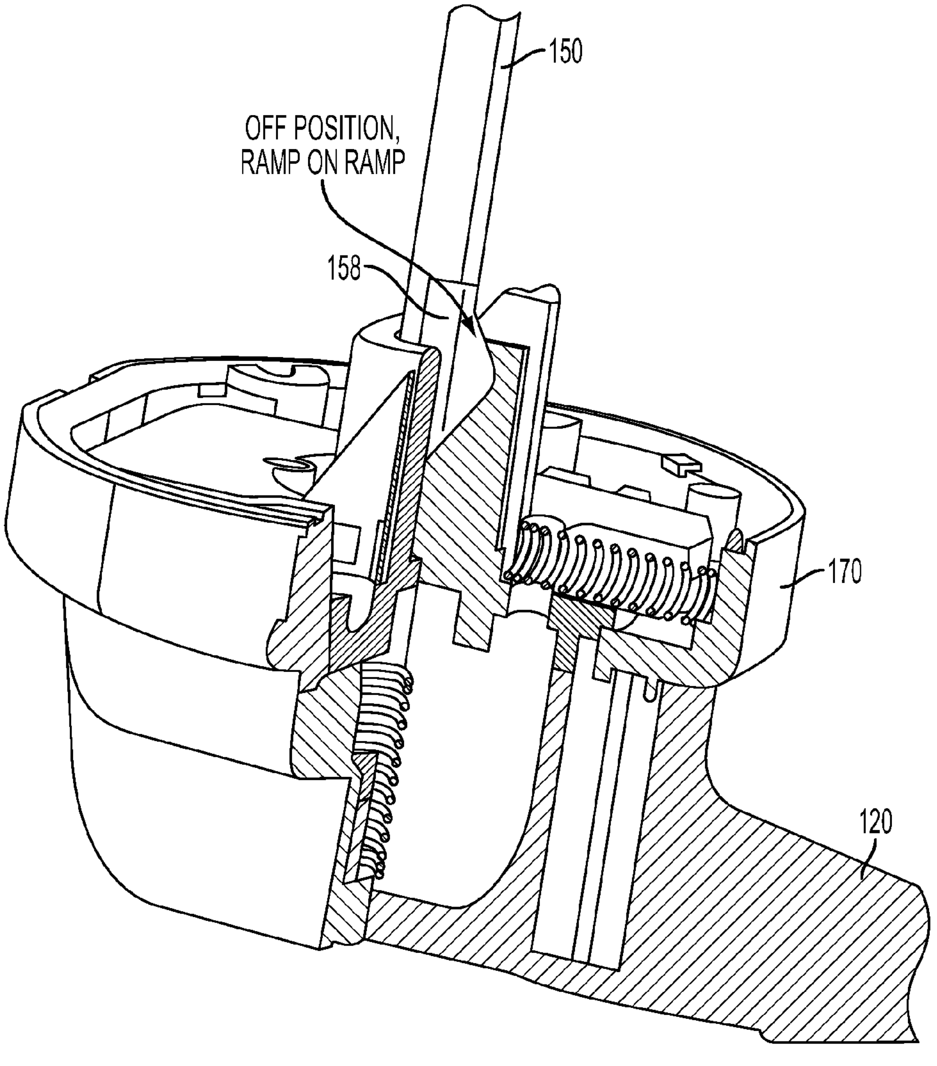
FIG. 6 illustrates a cut-away view of a perspective view of a handle assembly and a base assembly in accordance with one or more embodiments.

The shaft 150 interacts with, and depending on the orientation, is engaged by the defeater catch 192. In an example, depending on the shaft 150 orientation, such as a first orientation, prevents opening of the electrical box or (FIG. 5), in a second orientation, allows opening of the electrical box (FIG. 6). The shaft 150 includes a first structure such as a catch 156 at a first radial position and is adapted to prevent handle removal from the shaft (FIG. 5). In an embodiment, the shaft 150 includes a second structure such as a ramp 158 at a second radial position adapted to permit handle removal from the shaft. In an embodiment, the catch 156 and the ramp 158 are at substantially the same axial positions along the shaft. In another embodiment, the first and second structure are disposed about 90 degrees from one another, radially about the shaft. In another embodiment, the second end portion of the shaft includes an entry ramp 157.

During use of the system 104, referring to FIGS. 1 and 2, the handle assembly 120 is rotated, in an embodiment, to disconnect power to a machine or equipment, and optionally to allow the system 102 to be locked, for example, where power cannot be supplied to the equipment, such as during a repair, or a door to an enclosure 104 cannot be opened. The handle 122 is used to rotate the shaft 150. As the shaft 150 is rotated, structure along the radial portions of the shaft 150 rotate and interact with the defeater catch. In an example, FIG. 5 illustrates the shaft 150 in the ON position, where the shaft and the base assembly 170 prevent movement therebetween, and the enclosure, for example, cannot be opened. In the OFF position, as shown in FIG. 6, the ramp 158 of the shaft 150 allows relative movement between the shaft and the base assembly 170.

It is to be understood that the above description is intended to be illustrative, and not restrictive. Many other embodiments will be apparent to those of skill in the art upon reading and understanding the above description. It should be noted that embodiments discussed in different portions of the description or referred to in different drawings can be combined to form additional embodiments of the present application. The scope of the invention should, therefore, be determined with reference to the appended claims, along with the full scope of equivalents to which such claims are entitled.

What is claimed is:

1. A method comprising:

turning a handle of an assembly to an OFF position and locked position, the assembly including a handle assembly and a base assembly, where the handle assembly is rotatable relative to the base assembly;

depressing a cover of the handle assembly relative to the handle and moving the cover from a first position to a second position, the cover concealing at least a portion of a locking fixation feature when the cover is in the first position, the cover revealing at least a portion of the locking fixation feature when the cover is in the second position, the cover is movable relative to the handle;

disposing locking structure through at least a portion of the locking fixation feature;

locking a handle of the handle assembly in a particular orientation; and pivoting tabs of the base assembly and creating an opening, and disposing a portion of the cover within the opening when the cover is placed in the second position.

2. The method as recited in claim 1, further comprising preventing rotation of the handle assembly relative to the base assembly with at least a portion of the cover.

3. The method as recited in claim 1, further comprising moving the cover toward a position where the cover is received within base assembly.

4. The method as recited in claim 1, wherein moving the cover to the second position includes disposing one or more portions of the cover through the base assembly and preventing rotation of the handle assembly relative to the base assembly.

5. The method as recited in claim 1, further comprising moving operable barriers of the base assembly and allowing the cover to be moved within the base assembly to lock the handle assembly in multiple handle orientations.

6. The method as recited in claim 1, further comprising disposing one or more portions of the cover through the base assembly in two or more handle orientations.

7. A method comprising:

turning a handle of an assembly to an OFF position and locked position, the assembly including a handle assembly and a base assembly, where the handle assembly is rotatable relative to the base assembly;

moving a cover relative to the handle from a first position to a second position, the cover concealing at least a portion of a locking fixation feature when the cover is in the first position, the cover is movable relative to the handle;

disposing one or more portions of the cover within at least a portion of the base assembly in the second position and preventing rotation of the handle assembly relative to the base assembly with the one or more portions, revealing at least a portion of the locking fixation features when the cover is in the second position;

disposing locking structure through at least a portion of the locking fixation feature;

locking a handle of the handle assembly in particular orientation;

moving operable barriers of the base assembly, and moving the cover within the base assembly to lock the handle assembly in multiple handle orientations; and wherein moving operable barriers includes moving pivotable tabs and providing an opening in the base assembly to receive the cover therein.

8. The method as recited in claim 7, further comprising preventing movement of the handle assembly along a shaft with a defeater catch of the base assembly.

9. The method as recited in claim 7, wherein moving a cover from a first position to a second position includes overcoming a resilient force of a resilient member against the cover.

10. A method comprising:

turning a handle of an assembly to an OFF position and locked position, the assembly including a handle assembly and a base assembly, where the handle assembly is rotatable relative to the base assembly;

depressing a cover of the handle assembly and moving the cover from a first position to a second position, the cover concealing at least a portion of a locking fixation feature when the cover is in the first position, the cover revealing at least a portion of the locking fixation feature when the cover is in the second position;

disposing locking structure through at least a portion of the locking fixation features; and locking a handle of the handle assembly in a particular orientation; and pivoting tabs of the base assembly and creating an opening, and disposing a portion of the cover within the opening when the cover is placed in the second position.

* * * * *